US006390762B1

(12) United States Patent
Peery et al.

(10) Patent No.: US 6,390,762 B1
(45) Date of Patent: May 21, 2002

(54) APPARATUS FOR POSITIONING A MASSIVE ARTICLE UNDER A SECOND ARTICLE FOR ATTACHMENT THERETO

(75) Inventors: Walter J. Peery, Elizabethtown, KY (US); Floyd L. Kittrell, Jeffersonville, IN (US)

(73) Assignee: Strategic Technologies, Inc., Louisville, KY (US)

(*) Notice: Subject to any disclaimer, the term of this patent is extended or adjusted under 35 U.S.C. 154(b) by 0 days.

(21) Appl. No.: 09/563,722

(22) Filed: May 1, 2000

(51) Int. Cl.$^7$ ................................ B66F 9/06; B66F 9/14
(52) U.S. Cl. ................. 414/589; 414/352; 414/427; 414/495; 414/590
(58) Field of Search .............................. 414/589, 352, 414/427, 495, 590

(56) References Cited

U.S. PATENT DOCUMENTS

| | | | |
|---|---|---|---|
| 2,449,863 A | 9/1948 | Ross | 254/2 |
| 2,931,519 A | * 4/1960 | Beach | 414/589 |
| 3,459,312 A | * 8/1969 | Britcher, Jr. et al. | 414/495 X |
| 3,796,334 A | * 3/1974 | Torrey | 414/495 X |
| 4,082,195 A | 4/1978 | Wnek | 214/38 BA |
| 4,625,944 A | 12/1986 | Mankey et al. | 254/8 R |
| 4,643,630 A | * 2/1987 | Shiibag et al. | 414/589 |
| 4,692,087 A | 9/1987 | Olsen | 414/680 |
| 4,724,930 A | 2/1988 | VanLierop | 187/8.43 |
| 4,886,284 A | 12/1989 | Martinez, Jr. | 280/43.12 |
| 4,887,838 A | 12/1989 | Reppen | 280/656 |
| 5,083,892 A | 1/1992 | Oswald et al. | 414/458 |
| 5,318,313 A | 6/1994 | Chapman | 280/47.11 |
| 5,460,474 A | * 10/1995 | Iles | 414/590 |
| 5,655,733 A | 8/1997 | Roach | 244/50 |

FOREIGN PATENT DOCUMENTS

FR 2449057 * 10/1980 .............. 414/589

* cited by examiner

Primary Examiner—Steven A. Bratlie
(74) Attorney, Agent, or Firm—Maurice L. Miller, Jr.

(57) ABSTRACT

An apparatus for supporting and accurately positioning a massive article, such as a commercial aircraft landing gear, under a second separately supported second article, such as a commercial aircraft, to facilitate attachment of the articles is disclosed. The apparatus includes a main frame having a rectangular floor assembly defined by an array of spaced apart, uniformly distributed ball transfer elements and a border formed by raised end rails and side rails. A rectangular interior frame having a length and width less than that of the floor assembly and having a flat floor plate with raised end rails and side rails thereon is movably supported on the ball transfer elements. A first pair of aligned, oppositely coacting fluid cylinders, each being connected between a different interior frame end rail and a corresponding main frame end rail, operates for selective longitudinal movement of the interior frame between main frame end rails. A second pair of aligned, oppositely coacting fluid cylinders, each being connected between a different interior frame side rail and a corresponding main frame side rail, operates for selective transverse movement of the interior frame rails between main frame side rails. The cylinder connections to each of the main frame rails is movable along that rail with parallel movement of the interior frame. Lifting cylinders attached to opposite sides of the main frame operate to lift both frames and an article supported on the interior frame.

25 Claims, 5 Drawing Sheets

APPARATUS FOR POSITIONING A MASSIVE ARTICLE UNDER A SECOND ARTICLE FOR ATTACHMENT THERETO

BACKGROUND OF THE INVENTION

This invention relates generally to an apparatus for accurately positioning a massive article disposed thereon, such as a commercial aircraft landing gear, under a separately supported second article, such as under a landing gear bay of a commercial aircraft, to facilitate attachment of the massive article to the second article. More specifically, the invention relates to an article supporting apparatus, which may be in the form of a towable trailer, having an interior frame capable of selective longitudinal and transverse movement on a main frame, wherein the main frame may also be lifted and lowered for accurate positioning of the article under a second article to facilitate attachment and detachment of the two articles.

In the maintenance of large commercial and military aircraft, it becomes necessary from time to time to replace various strut seals on a seal carrier in a strut housing of an aircraft landing gear assembly. To accomplish this task in the prior art, hydraulic jacks are placed under the fuselage and wings of the aircraft, such as, for example, a Boeing 767, and the aircraft is lifted so that the massive landing gear assemblies are suspended above and clear of the aircraft supporting surface. Next, two portable hydraulic jacks are placed on opposite sides of one of the landing gear assemblies, nitrogen gas is then released from the landing gear shock absorbers and the portable jacks are extended to raise the landing gear assembly against the now readily compressible shock absorbers. With the landing gear assembly thus raised, a gland nut on a lower end of the landing gear strut becomes unloaded of weight and can then be readily loosened with a wrench to decouple the strut from its fittings in the aircraft landing gear bay. Thereafter, the portable jacks are retracted to lower the decoupled landing gear to permit access to an upper end of the strut for the purpose of changing the strut seals. Sometimes, however, retraction of the portable jacks alone is insufficient to satisfactorily expose the strut seal carrier, by reason of which it may be necessary to further extend the jacks under the aircraft fuselage and wings to raise the aircraft further until the strut seal carrier becomes sufficiently exposed to permit replacement of the seals.

Once the strut seals have been replaced, the portable jacks are again extended to raise the landing gear strut and, if necessary, the jacks under the wings and fuselage are partially retracted to enable the strut to be properly rejoined to its fittings in the landing gear bay, whereupon the gland nut is tightened and, thereafter, the shock absorbers are recharged with nitrogen gas. Finally, the portable jacks are retracted and removed from the landing gear assembly and the wing and fuselage jacks are further retracted until the landing gear assemblies engage the aircraft supporting surface to securely support the aircraft. The task is time consuming and tedious and the use of the portable jacks is dangerous as they can relatively easily be tipped over with the weight of a one ton or more landing gear assembly resting thereon, often with disastrous consequences to workers and/or to equipment in the area. It is especially dangerous if the portable jacks need to be moved slightly in order to precisely position a landing gear supported thereon in a raised position in order to join the struts to the gear bay fittings.

Sometimes it is necessary to completely remove a landing gear assembly from a large commercial or military aircraft to a remote work station for more thorough inspection and repair than is possible with the strut remaining in close proximity to it's coupling position in the landing gear bay of the aircraft. In such cases, while the assembly is readily removable to such a remote work station by simply rolling it on its tires, return of the assembly for reattachment to its fittings in the aircraft landing gear bay presents a major problem of precisely positioning the assembly for reattachment due to it being elevated on jacks and due to the extremely close tolerances of the landing gear fittings in the aircraft with the landing gear strut coupling and due to the great weight of the gear assembly.

By means of our invention, the considerable danger to attending workers in using unstable portable jacks to support and elevate massive landing gear assembly and in moving the jacks with the assembly supported thereon is virtually eliminated. Moreover, by means of our invention, the time required in using conventional methods and equipment to replace landing gear strut seals and to precisely position a massive landing gear assembly for attachment under and to a large aircraft is substantially reduced.

SUMMARY OF THE INVENTION

It is an object of our invention to provide an apparatus for accurately positioning a massive article disposed thereon, much as a commercial aircraft landing gear, under a separately supported second article, much as a commercial aircraft, to facilitate attachment of the massive article to the second article.

It is a further object of our invention to provide a mobile article supporting and positioning apparatus which includes a longitudinally and transversely movable interior frame within a main frame and further includes means for lifting and lowering the main frame, the interior frame and an article supported on the interior frame.

Briefly, in accordance with our invention, there is provided an apparatus for accurately positioning a massive article disposed thereon under a separately supported second article to facilitate attachment of the massive article to the second article. The apparatus includes a main frame having longitudinally spaced apart opposite ends and transversely spaced apart opposite sides and an interior frame for supporting a massive article thereon which is movably disposed on the main frame. The interior frame is selectively movable, longitudinally, up to a first maximum distance between the opposite ends of the main frame and is also selectively movable, transversely, up to a second maximum distance between the opposite sides of the main frame. The apparatus also includes a first means connected between the interior frame and the main frame for moving the interior frame a selected distance, longitudinally, of up to the first maximum distance between the opposite ends of the main frame. The apparatus further includes a second means connected between the interior frame and the main frame for moving the interior frame a selected distance, transversely, of up to the second maximum distance between the opposite sides of the main frame.

These an other objects, features and advantages of our invention will become apparent to those skilled in the art from the following detailed description and attached drawings upon which, by way of example, only a preferred embodiment of our invention is described and illustrated.

DESCRIPTION OF THE PREFERRED EMBODIMENT

Figure 1:
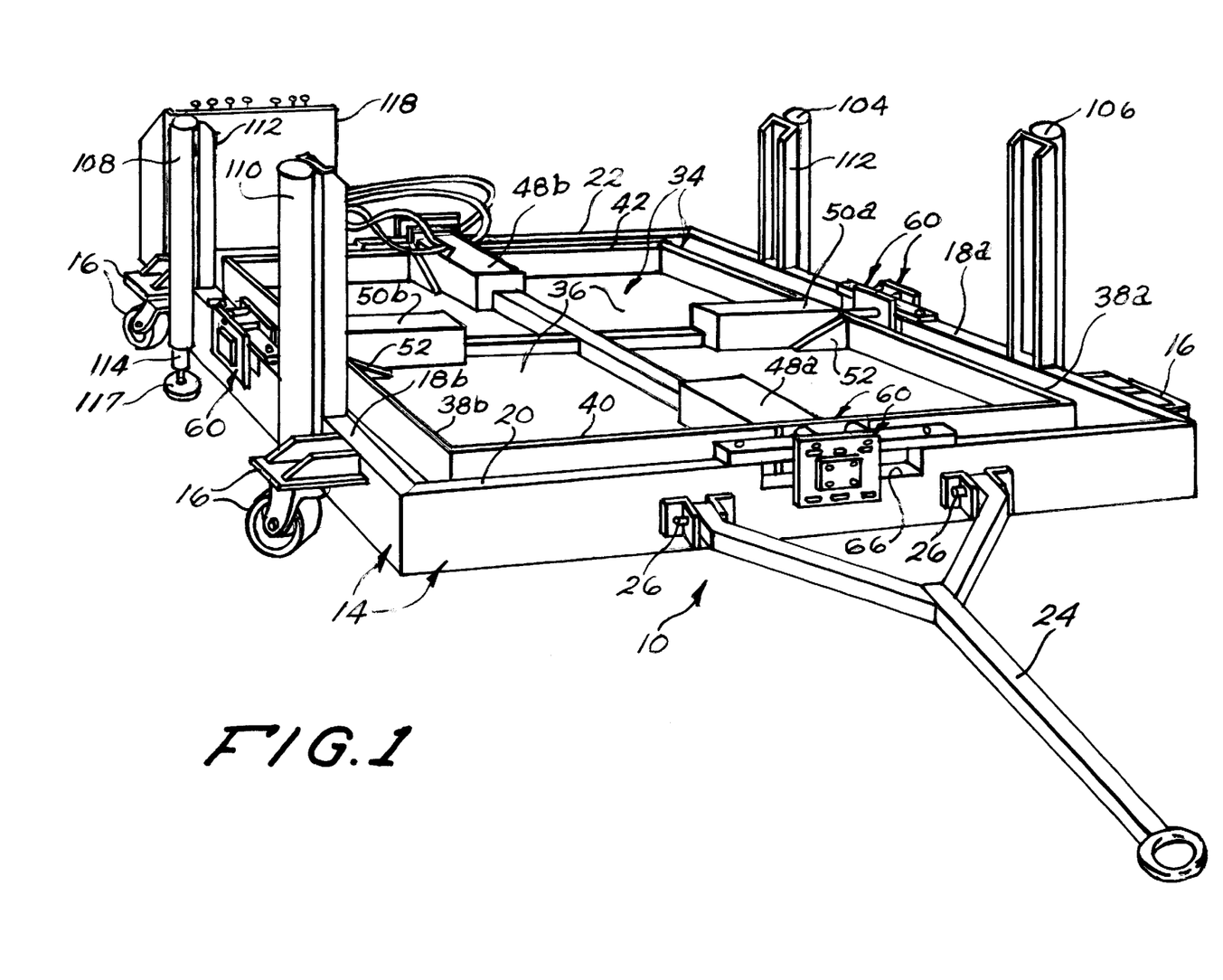
FIG. 1 shows a perspective view of a transporter for aircraft landing gear, thus illustrating a preferred embodiment of our invention.
Figure 2:
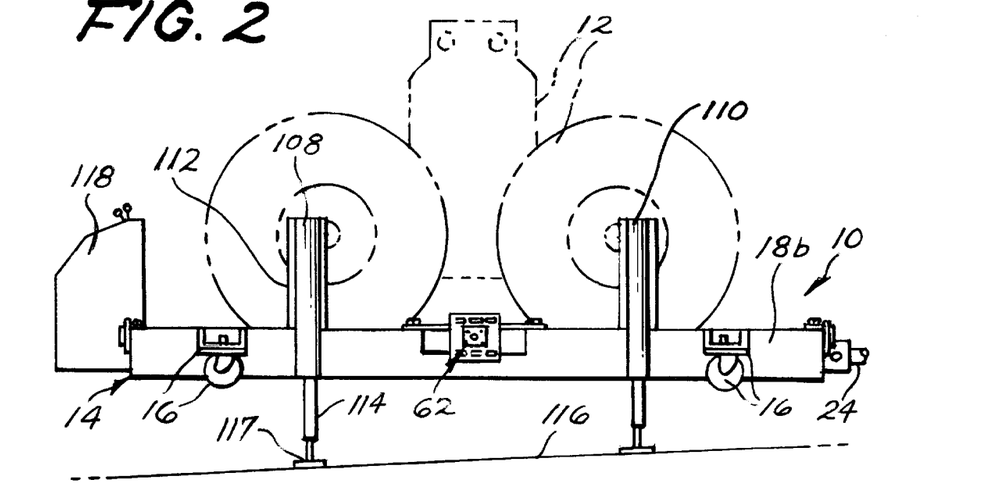
FIG. 2 shows a side elevation view of the transporter of FIG. 1 illustrating placement of an aircraft landing gear, shown in phantom, thereon, the transporter being in a stationary raised, level position over an inclined supporting surface.
Figure 3:
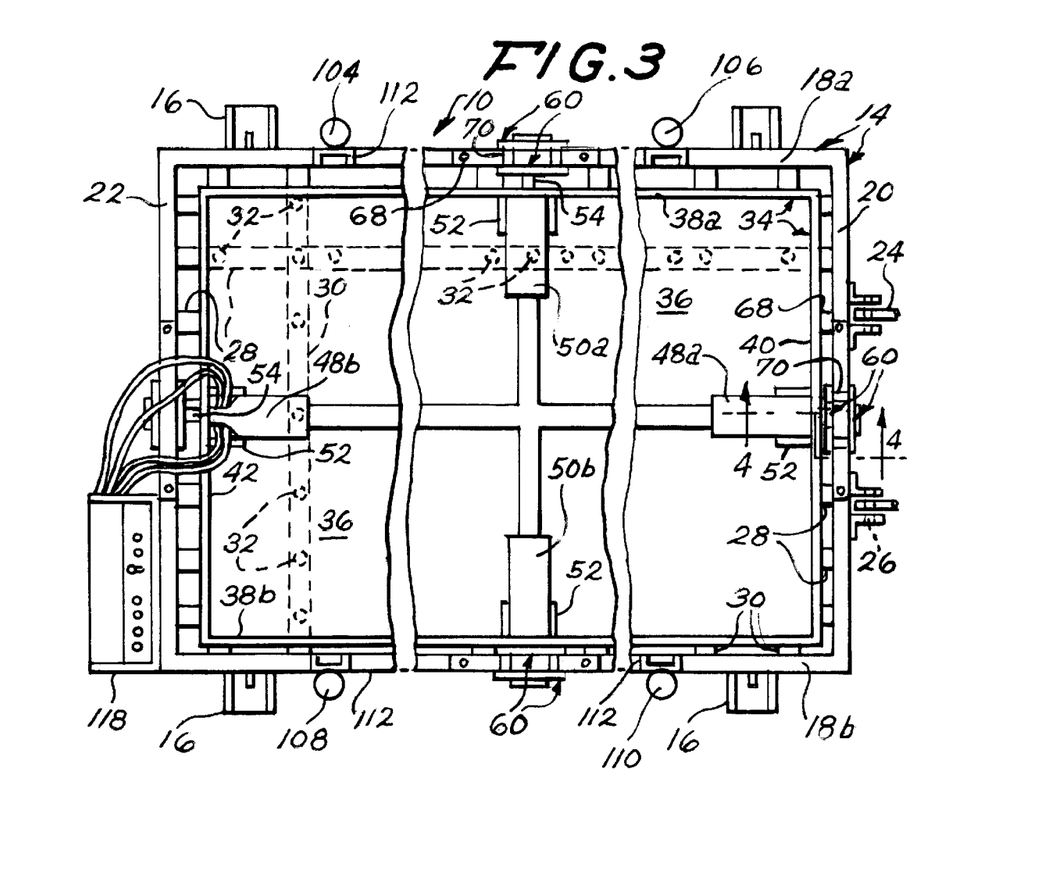
FIG. 3 shows a top plan view of the transporter of FIGS. 1–2.

Referring now to the drawing figures, there is shown, in a preferred embodiment of our invention, an apparatus, in the form of a trailer or transporter, generally designated 10, for transporting and positioning a massive article disposed thereon, such as an aircraft landing gear assembly 12 as shown in phantom in FIG. 2, under a second separately supported article such as a large commercial on military aircraft, not shown, to facilitate attachment thereto. The transporter 10 includes a rectangularly shaped outer or main frame, generally designated 14, which may be movably supported on four swivel caster assemblies 16, two of which assemblies are attached in spaced apart relationship on each side of the main frame as best seen in FIG. 3. The main frame 14 includes a pair of elongated, parallel extending side rails 18a and 18b which are preferable made of steel and which are joined at corresponding opposite ends by front and rear rails 20 and 22, also preferably made of steel. A steel trailer tongue or tow bar 24 is attached to a central portion of the front rail 20 by pivot pins 26 (FIG. 1) for vertical tilting movement of the tow bar relative to the main frame 14 for permitting the apparatus 10 to be towed by means of a conventional self propelled vehicle such as a tractor, truck or the like, not shown.

The main frame 14 includes a first series of elongated, longitudinally extending, spaced apart slats or bars 28 which extend between and connect to the front and rear rails 20 and 22 and a second series of elongated, transversely extending, spaced apart slats or bars 30 which extend between the side rails 18a and b. The bars 28 and 30 are preferably made of 2 inch by 2 inch steel bar stock and each contains a row of spaced apart, upwardly facing, ball rollers or ball transfer elements 32 bolted to upwardly facing surfaces of the bars. The ball transfer elements 32 define a floor assembly of the main frame 14 and are of conventional type such as those sold by McMaster Carr Co. of Chicago, Ill. under part number 567K17 or the like which have a rated loading of 75 lbs. each. The bars 28 intersect with the bars 30 and are welded together at their intersections. Opposite outer ends of the bars 28 are welded to the front and rear rails 20 and 22 and opposite outer ends of the bars 30 are, likewise, welded to the side rails 18a and 18b.

The apparatus 10 also includes a rectangularly shaped interior frame or pan generally designated 34, having a flat steel floor plate or landing gear support plate 36 welded along side edge portions to a pair of side rails 38a and 38b and, along front and rear edge portions, to front and rear rails 40 and 42, respectively. In a preferred example of our transporter 10, the plan view dimensions of the floor assembly main frame 14 are 120 inches by 80 inches. The interior frame 34 is smaller in both outside length and width dimensions than those of the main frame floor assembly 32, preferably 104 inches, by 64 inches so as to fit within the latter with the support plate 36 rollably supported on a large portion of the transfer elements 32 at all times, for movement of the interior frame both longitudinally and transversely within the main frame between the front and rear rails 20 and 22 and between the side rails 18a and b, respectively. In the preferred example of our invention, we employ a total of 150 of the ball transfer elements 32 in a uniformly distributed and equally spaced apart array on the bars 28 and 30 so as to insure that the plate 36 will bear evenly upon a majority of them, regardless of the interior frames position within the main frame 14.

Figure 4:
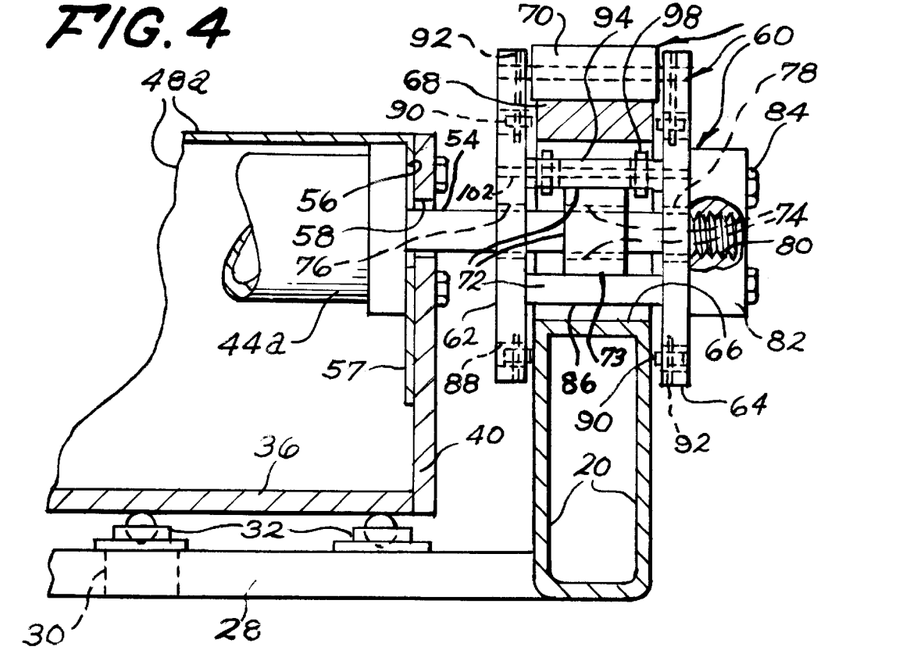
FIG. 4 shows a cross-sectional view of a fragment of the transporter of FIGS. 1–3 as viewed along cross-section lines 4—4 of FIG. 3.
Figure 7:
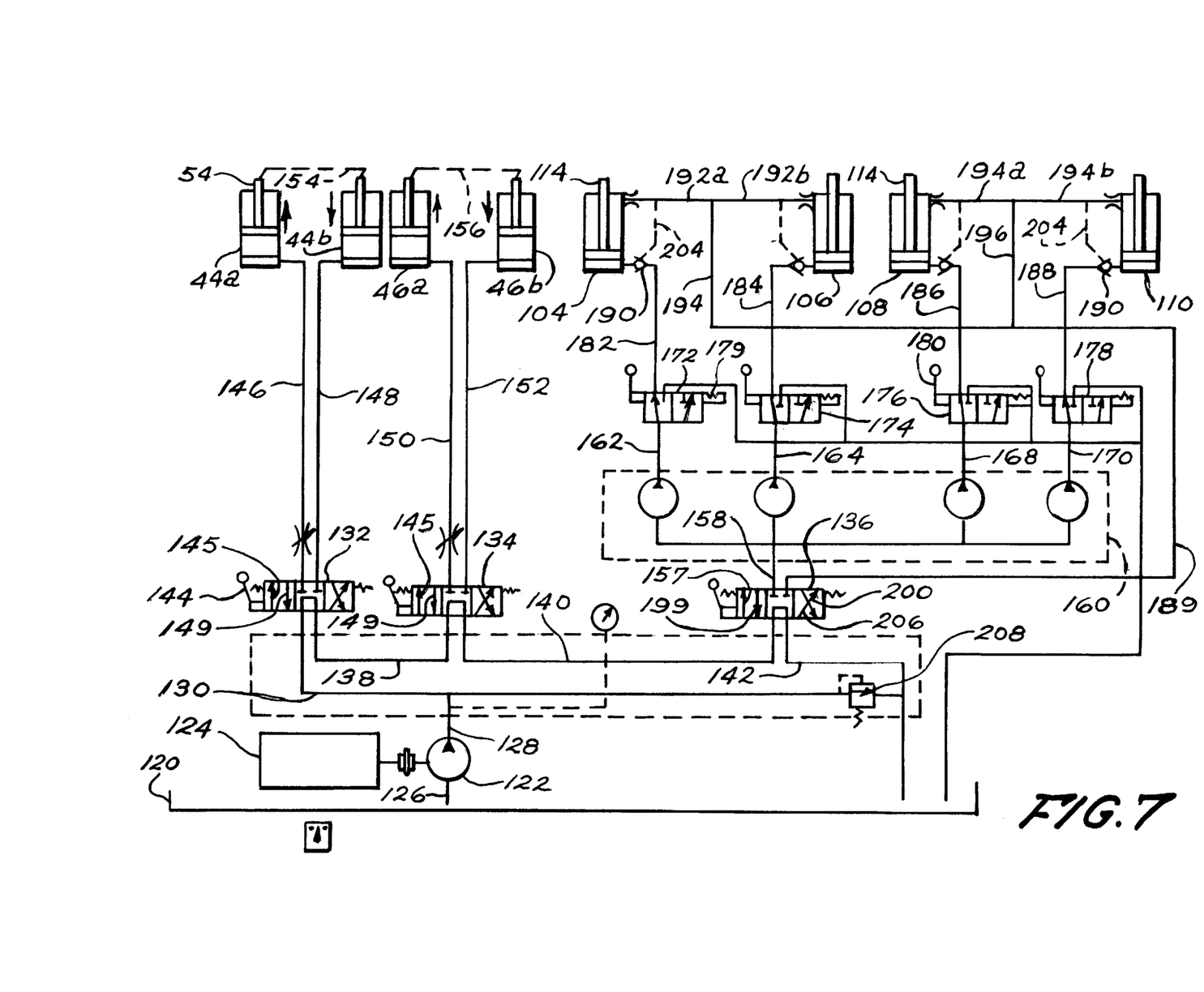
FIG. 7 shows a schematic diagram of a hydraulic circuit for operating vertical main frame lifting and horizontal interior frame positioning cylinders of the transporter of FIGS. 1–3.

The interior frame 34 is sized to be horizontally movable, both longitudinally and transversely, on the ball transfer elements 34 within the confines of the larger main frame 14 by means of the operation of two coacting and separately aligned pairs of identical, single acting, hydraulic, interior frame positioning cylinders 44a, b and 46a, b (See the two coacting pairs of cylinders in FIG. 7 and a single one of the cylinders at 44a in FIG. 4). The interior frame positioning cylinders 44a, b and 46a, b are each mounted in a different cylinder housing 48a, b and 50a, b, respectively, which housings are disposed in the interior frame 34 on the support plate 36 between separate pairs of interior frame rail reinforcing gusset plates 52 (See FIGS. 1 and 3). The housings 48a and b and their corresponding interior frame positioning cylinders are aligned with each other on a longitudinal centerline of the interior frame 34 while the housing 50a and b and their corresponding interior frame positioning cylinders are aligned with one another along a transverse centerline of the interior frame. Each of the interior frame positioning cylinders 44a, b and 46a, b is positioned so that it's piston rod 54 extends through a circular opening 56 (FIG. 4) formed through a front cover plate 57 of the corresponding cylinder housing and, thence, through a similar opening 58 in an adjacent one of the interior frame rails 38a, 38b, 40 and 42 as, for example, the rail 40 in FIG. 4, to a connection with a different one of four main frame rail guide assemblies, generally designated 60.

Figure 6:
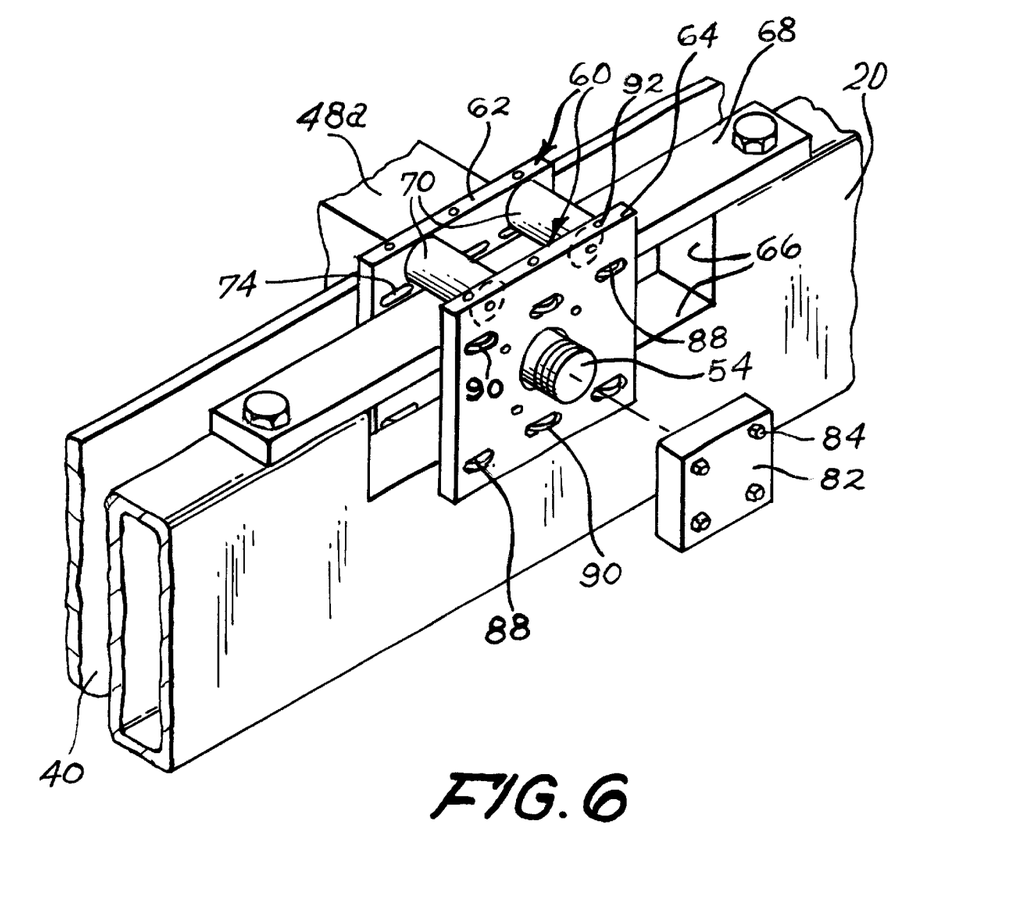
FIG. 6 shows a partially exploded perspective view of the transporter fragment of FIG. 4.

The four main rail guide assemblies 60 are identical in construction and each rides along a central portion of a different one of the main rails 18a, 18b, 20 and 22 as the interior frame 34 moves parallel to such main frame rail. For example, as shown in FIGS. 4 and 6, the illustrated assembly 60 moves along the front rail 20 as the cylinder 44a and corresponding cylinder housing 48a moves with the plate 36 in a direction parallel to the front rail 20. Each of the assemblies 60 include a pair of parallel, spaced apart, rectangularly shaped and vertically extending plates 62 and 64 which are spaced on opposite sides of a horizontally extending slot 66 formed in an upper central portion of a corresponding main frame rail 18a, 18b, 20 and 22 as, for example, the front rail 20 as shown in FIGS. 4 and 6. An elongated, relatively flat, steel bar 68 is attached to an upper surface of each of the main rails 18a, 18b, 20 and 22 to form a closed upper side over the corresponding main frame rail slot 66.

Figure 5:
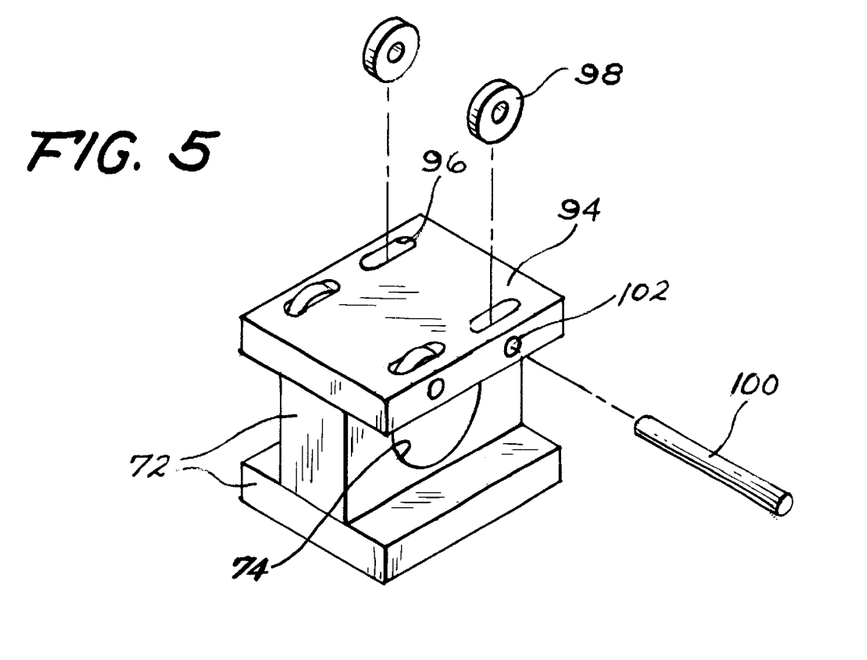
FIG. 5 shows a perspective view of certain parts of the transporter fragment of FIG. 4.

The assembly 60 further includes a pair of cylindrically shaped steel rollers 70 which are spaced apart and disposed in upper opposite corner portions of the plates 62 and 64. The rollers 70 are adapted to roll along the bar 68 as the assembly 60 moves along the slot 66 in the main frame rail 20 as the interior frame 34 moves parallel to that rail. The assembly 60 also includes an H-shaped spacer block 72 (See FIG. 5) disposed between and attached to the plates 62 and 64 which has a central member 73 defining an opening 74 therethrough which registers with central openings 76 and 78 in the plates 62 and 64, respectively. The interior frame positioning cylinder rod 54 extends through the opening 76 in the plate 62, thence through the opening 74 in the spacer block 72 and across the slot 66 and, finally, through the opening 78 in the plate 64 where it is threaded into a tapped blind socket 80 in a cylinder rod end cap 82. The end cap 82 is, in turn, fastened to an outwardly facing surface of the plate 64 by means of suitable threaded fasteners 84.

The rollers 70 thus roll along the bar 68 and maintain a spacing of a lower surface 86 of the spacer block 72 alone a base of the slot 66 as the assembly 60 moves back and forth along the corresponding main frame rail. Also, as the assembly 60 moves along the rail 20 (for example), the plates 62 and 64 are intended to float alongside and in spaced relation from the rail 20 and the corresponding bar 68 without rubbing and potentially, binding against them. However, to insure against such rubbing movement, the plates 62 and 64 each contain an upper row and a lower row of three spaced apart slots 88 each, containing horizontally rotatable roller bearings 90 which rotate on pins inserted into either upwardly or downwardly opening shafts 92 drilled downwardly into an upper edge portion or upwardly into a lower edge portion of the plate 62 and 64, respectively. Accordingly, the upper row of rollers can rollably engage opposite edges of the bar 68 the lower row of rollers can rollably engage opposite sides of the rail 20 below the base of the slot 66 in the event the plates 62 and 64 are jolted in a manner that would otherwise tend to cause them to touch or rub against the bar and rail as the assembly 60 moves along the rail. The spacer block 72 also includes an upper plate 94 containing two spaced apart pairs of slots 96, in each of which is disposed a vertically rotatable roller bearing 98. Pins 100 on which the bearings 98 rotate are inserted into shafts 102 formed through opposite edges of the upper plate 94. Upper portions of the periphery of the rollers 98 project upwardly out of the slots 96 so as to rollably engage a lower surface of the bar 68 (See FIGS. 4–5) to prevent the upper plate from occasionally striking and rubbing and, perhaps binding, against the bar as the assembly 60 moves along the main front rail 20. Once the pins for the rollers 90 and the pins 100 for the rollers 98 are inserted in their respective shafts 92 and 102, respectively, a suitable glue, such as an apoxy, can be placed over the open end of the shafts and allowed to dry or cure in order to maintain the pins in place.

Accordingly, the interior frame 34 is movable longitudinally up to a first maximum distance of about 16 inches between front and rear rails of the main frame 14 and transversely up to a second maximum distance of about 16 inches between side rails and main frame. This allows for a maximum movement of the interior frame 34 of about 8 inches in opposite longitudinal and transverse directions when the interior frame is centered on the ball transfer elements 32 of the main frame 14. Thus, with the landing gear 16 disposed on the floor plate 36 of the interior frame centered within the main frame, the apparatus 10 can be roughly positioned by line of sight under a landing gear bay of an elevated commercial aircraft. Final, positioning of the landing gear 16 for attachment to appropriate fittings in the landing gear bay can then quickly, safely and with a high degree of accuracy by operating the cylinders 44a,b and 46a,b.

In addition to the two coacting pairs of interior frame position cylinders 44a, b and 46a, b, the apparatus 10 also includes four identical, hydraulically operated, double acting, main frame lifting cylinders 104, 106, 108 and 110, two of which are located in spaced apart relationship on each side of the main frame 14 (See FIGS. 1 and 3). The lifting cylinders 104, 106, 108, and 110 contain the usual cylinder bodies which are attached to vertically extending steel channels 112 with their piston rods 114 extending downwardly toward an apparatus supporting surface 116. The channels 112 may be welded along their base portions to the side rails 18a, and 18b. A conventional disc shaped support plate or level mount 117 (FIG. 1) is threadably secured to a lower end of each of the piston rods 114.

Now, with particular reference to FIGS. 1 and 3 and the hydraulic control circuit of FIG. 7 for controlling both than interior frame positioning cylinders 44a, b and 46a, b and the main frame lifting cylinders 104, 106, 108 and 110 will now be explained. A control cabinet or console 118 is mounted on the rear rail 22 of the main frame 14 for controlling the hydraulic circuit and contains a hydraulic fluid reservoir tank 120, a hydraulic fluid pump 122, an electrically operated pump motor 124 and the various valves necessary to operate the hydraulic circuit. The pump 122 draws hydraulic fluid from the reservoir 120 through a line 126 and directs it, under pressure, into a line 128 and 130 where it is fed to three, series connected, 3-position directional control valves 132, 134, and 136, in that order. The valves 132, 134 and 136 are mounted on a manifold 129 and are each spring biased to a normal center position as shown in FIG. 7 wherein hydraulic fluid is normally circulated through the valve 132 to a line 138, thence, through the valve 134 to a line 140 and, finally, through the valve 136 to a line 142 back to the reservoir 120. To move the interior frame 34 in a first longitudinal direction relative to the main frame 14, a lever or handle 144 on the valve 132 is moved so as to shift the valve either toward the right or the left as viewed in FIG. 7. Assuming the handle 144 is moved to shift the valve 132 to the right as viewed, fluid will then flow from the pump 122 and line 128, through the line 130 and toward the cylinder 44a through a valve path 145 in the valve 132 and into a line 146.

Accordingly, the piston rod 54 of the cylinder 44a will extend, thus applying a pulling force against the interior frame rail 40, to which the cylinder body is affixed (See also FIG. 4), to move the interior frame 34 in a longitudinally rearward direction away from the front rail 20 of the main frame 14. As the piston rod 54 of the cylinder 44a extends to move the interior frame 34 rearwardly, such rearward movement causes the rear interior frame rail 42 to move toward the rear main frame rail 22 to, in turn, force the piston rod 54 of the coacting cylinder 44b to retract. Such retraction will occur because, with the valve 144 in the far right hand position as viewed, hydraulic fluid will be forced out of the body of the cylinder 44b into a line 148, back through a valve path 149 in the valve 132 and into the line 138, valve 134, line 140, valve 136 and, finally to the reservoir 120 through the line 142.

To move the interior frame 34 in a longitudinally forward direction relative to the main frame, the handle 144 is operated to move the valve 132 to the far left as viewed. This has the effect of switching the line 130 into contact with the line 148 and the line 138 into contact with the line. 146. Accordingly, high pressure hydraulic fluid is pumped into a base of the cylinder 44b to cause the corresponding piston rod 54 to extend and thus cause the cylinder body to pull the rear interior frame rail 42, to which the body is connected, away from the rear main frame rail 22. At the same time, as the front interior frame rail 40 approaches the front main frame rail 20, the piston rod 54 of the cylinder 44a retracts, thus forcing hydraulic fluid out of the body of the cylinder 44a into the line 146, thence into the line 138 and, ultimately, through the line 142 back to the reservoir 120. Thus, the cylinders 44a and 44b always operate together, but in opposite directions with one expanding to move the interior frame 34 in one longitudinal direction while the other retracts in response to such interior frame movement.

Transverse movement of the interior frame 34 is accomplished in the same manner using the valve 134 and the cylinders 46a and 46b as was the case with longitudinal movement using the valve 132 and cylinders 44a and 44b. Accordingly, movement of the handle of the valve 134 to shift the valve toward to the far tight, as viewed in FIG. 7, will connect the pump 122 through the lines 128, 130 and valve 132 (when in its normal center position as shown) into the line 138, thence through a valve path 145 of the valve 134 to a line 150 to extend the piston rod 54 of the cylinder 46a to move the interior frame 34 away from the side rail 18a and toward the side rail 18b. At the same time piston rod 54 of the cylinder 46b will be retracted as the interior frame rail 38b moves toward the main frame side rail 18b to force hydraulic fluid out of the cylinder 46b into a line 152, thence through a valve path 149 of the valve 134 and, ultimately, back through the line 142 to the reservoir 120. Cooperation of the piston rods 54 of the coacting pairs of cylinders 44a, b and 46a, b is schematically represented in FIG. 7 by dashed lines 154, 156, respectively, which adjoin the coacting pairs of piston rods.

Now, with regard to operation of the lifting cylinders 104, 106, 108 and 110, hydraulic fluid is presented to them, either individually or collectively, as desired, from the pump 122 through the valves 132 and 134, when those valves are in their normal center positions, as viewed, along the line 140 and to the valve 136. When the valve 136 is in its normal center position as shown, fluid is simply returned to the reservoir 120 through the line 142. As a handle of the valve 136 is operated to shift the latter to the far right, as viewed, hydraulic fluid flows through a valve path 157 of the valve 136 into a line 158 to a 4-way flow divider 160 and out of the flow divider along lines 162, 164, 166 and 168 to four identical, 2-position, valves 172, 174, 176, and 178, respectively.

A detent 179 in each of the valves 172, 174, 176 and 178 permits each of those valves to occupy either one of two positions by means of operation of a corresponding valve handle 180. The valves 172, 174, 176 and 178 are shown in FIG. 7 in an ON or open position for introduction of hydraulic fluid into lines 182, 184, 186 and 188 for presentation, through four one-way check valves 190 into a base of the lifting cylinders 104, 106, 108 and 110, respectively. Accordingly, with the valve 136 shifted to the far right, from it's central position as shown, and with the valves 172, 174, 176 and 178 in their open positions as shown, piston rods 114 of the four cylinders 104, 106, 108 and 110 will actually extend downwardly against the apparatus supporting surface 116 (see FIG. 2) to lift the bodies of the cylinders and the main frame 14 interior frame 34 and the landing gear 12, although such piston rods appear to extend upwardly as viewed schematically in the circuit diagram of FIG. 7. As the piston rods 114 extend, hydraulic fluid in each of the cylinders 104, 106, 108 and 110 on the opposite sides of their respective pistons will be emptied into lines 192a, b and 194a, b, then into lines 194 and 196, then through a line 198 and a valve path 199 in the valve 136, back to the reservoir 120 through the line 142. Once the piston rods 114 have lifted the main frame 14 to the desired height above the supportive surface 116 or once those piston rods become fully extended, the handle of the valve 136 is released, to permit that valve to return to its central position, as shown, under the influence of its biasing spring. Thereafter, hydraulic fluid pumped through the line 140 will simply circulate through the centered valve 136 back to the reservoir 120 through the line 142.

To lower the main frame 14 from a raised position, the piston rods 114 of the cylinders 104, 106, 108 and 110 are retracted from their extended or partially extended positions. This is accomplished by leaving the three 2-way detent valves in their ON positions as shown and by shifting the 3-way valve 136 to the far left as viewed in FIG. 7. Such action thus directs hydraulic fluid from the pump 122 into the valve 136 from the line 140 and along a valve path 200 into the line 198, thence into lower ends of the bodies of the cylinders 104, 106, 108 and 110 (upper ends as viewed schematically in FIG. 7) and into the lines 192a, b and 194a, b. At the same time, high pressure in the lines 192a,b and 194a,b is transmitted by pilot lines 204 to check valves 190 to cause the latter to open so that hydraulic fluid can be forced out of the upper ends of the cylinders 104, 106, 108 and 110 (the lower ends as viewed in FIG. 7) back along lines 182, 184, 186 and 188 respectively, and through the flow divider 160, thence along a valve path 206 in the valve 136 back to the reservoir 120 through the line 142.

To adjust any one or more of the lifting cylinders 104, 106, 108 and 110 without adjusting the others, as when leveling the main frame 14 and interior frame 34 in a elevated position over an uneven or inclined surface, such as at 116 in FIG. 7, it is merely necessary to the first disable those of the lifting cylinders which are not to be adjusted. To do this, assume that the cylinders 104 and 108 at the rear of the main frame 14 are to be extended more than the cylinders 106 and 110 at the front, as suggested in FIG. 2. Accordingly, the front lifting cylinders 106 and 110 are disabled by shifting their corresponding valves 174 and 178, respectively, to the OFF position, to the far left as viewed in FIG. 7. Next, with the valves 172 and 176 in their ON positions as shown, the valve 136 is shifted to the far right, as viewed, against the valves spring bias long enough to raise the cylinders 104 and 108 sufficiently to level the frame 14 and interior frame 34 above the inclined surface 116. A suitable pilot operated relief valve 208 should be placed in the line 130 as shown, which is normally closed, but which will open to allow hydraulic fluid to drain from the line 130, before the pressure in that line reaches such as high value as might damage the pump 122, the motor 124 or rupture any of the high pressure lines of the circuit of FIG. 7.

To complete the circuit of FIG.7, see the following table of suitable components for this example:

| ELEMENT | DESCRIPTION |
| --- | --- |
| Pump 122 and Motor 124 | Delta CT8 + C1154(1.5 hp, 1725 rpm) |
| 4-way Divider 160 | Delta PPM-2 |
| 3-position valves 132 and 134 | 2-Bosch No. 0810091383 |
| 3-position valve 136 | Bosch No. 0810091526 |
| Manifold 129 | Damon No. A-D03-5-03-5/5 |
| Interior Frame Positioning Cylinders 44a, 44b, 46a and 46b | 4-Airdro No. ASH-MF1 2 × 11 NC 1.375 # 2-U |
| Main Frame Lifting Cylinders 104, 106, 108, and 110 | 4-Airdro ASH-M52 2.5 × 24 NC 1-¾" #2 MOD U |
| Pilot Operated Check Valves 190 | 4-Sun CKCBXCMECJ |
| 2-position Detent Valves 172, 174, 176 and 178 | 4-Appolo 3-way BV Nos. No. 70-603 |
| Level Mounts 117 (See FIG. 1) | 4-WW GRAINGER No. 2G369 |
| Safety Relief Valve 208 | Sun CKCB-XCN-ECT |

Those skilled in the art will appreciate that details of this example of the invention can be modified by suitable equivalent structure without departing from the spirit of our invention. For example, other suitable means for moving the interior frame 34 could be employed in place of the hydraulic cylinders 44a, b and 46a, b such as air operated cylinders. Also, the frame 34 could be provided for longitudinal and transverse movement by substituting a first manually operable screw jack in place of one of the transversely aligned cylinders and a second one of the cylinders could then be replaced by simple elongated, cylindrically shaped rod fixedly connected between a corresponding one of the interior frame rails 38a and 38b, 40 and 42 and sidably connected for movement into and partially out of a corresponding main frame rail guide assembly 60 as the screw jack aligned with it is operated to move the interior frame. The hydraulic lifting cylinders 104, 106, 108 and 110 could be replaced by high pressured air operated cylinders if desired.

Although the present invention has been described with respect to specific details of a certain preferred embodiment thereof, it is not intended that such details limit the scope and coverage of this patent other than as specifically set forth in the following claims, including reasonable equivalents thereof.

We claim:

1. An apparatus for accurately positioning a massive article disposed thereon under a separately supported second article for facilitating attachment or removal of said massive article to or from said second article, said apparatus comprising a main frame having a pair of raised, longitudinally placed apart end rails and a pair of raised, transversely spaced apart side rails, said main frame also having a floor assembly connected to and extending between lower end portions of said main frame rails, said floor assembly including a plurality of spaced apart and uniformly distributed ball transfer elements;

an interior frame having a flat floor plate, a pair of raised, longitudinally spaced apart end rails mounted on opposite end portions of said floor plate and a pair of raised, transversely spaced apart side rails mounted on opposite side portions of said floor plate, said floor plate being sized to support a massive article thereon between said interior frame rails, said floor plate being movably supported on a portion of said ball transfer elements such that said interior frame can be moved longitudinally on said main frame floor up to a first maximum distance between main frame end rails and can be moved transversely on said main frame floor up to a second maximum distance between said main frame side rails;

a first pair of moving means wherein each of said first pair is connected between a different one of said interior frame end rails and a nearest one of said main frame end rails for cooperatively moving said interior frame longitudinally on said ball transfer elements up to said first maximum distance;

a second pair of moving means wherein each of said second pair is connected between a different one of said interior frame side rails and a nearest one of said main frame side rails for cooperatively moving said interior frame transversely on said ball transfer elements up to said second maximum distance; and means attached to said main frame for lifting the entire main frame up to a selected maximum vertical distance off of a main frame supporting surface in order to lift said interior frame and a massive article supported thereon.

2. The apparatus of claim 1 wherein said main frame is mobile.

3. The apparatus of claim 1 wherein said main frame includes a tow bar attached to a front one of the end rails of said main frame such that said main frame forms a towable trailer assembly.

4. The apparatus of claim 1 wherein said main frame is supported on a series of swivel casters.

5. The apparatus of claim 1 wherein said series comprises four swivel casters, two of said casters being located on each of the opposite side rails of the main frame.

6. The apparatus of claim 1 wherein said lifting means comprises a plurality of four jointly and separately operable fluid lifting cylinders, each of said lifting cylinders having a cylinder body, a different pair of said cylinder bodies being fixedly attached to each of the side rails of said main frame.

7. The apparatus of claim 1 wherein said first moving means comprises a first pair of coacting, fluid operated interior frame positioning cylinders.

8. The apparatus of claim 1 wherein said first pair of interior frame positioning cylinders comprises two single acting, hydraulically operated cylinders, each of which first pair of interior frame positioning cylinders retracts in response to an extension of the other of said interior frame positioning cylinders.

9. The apparatus of claim 1 wherein said first pair of interior frame positioning cylinders each comprises a cylinder body which is fixedly connected to a different end of said interior frame, and a piston rod which is connected to a nearest one of the opposite ends of said main frame so as to be reciprocally movable along the nearest one of the opposite ends of said main frame with parallel movement of said interior frame between the opposite sides of said main frame.

10. The apparatus of claim 1 wherein said second moving means comprises a second pair of coacting, fluid operated interior frame positioning cylinders.

11. The apparatus of claim 1 wherein said second pair of interior frame positioning cylinders comprises two single acting, hydraulically operated cylinders, each of which second pair of interior frame positioning cylinders retracts in response to an extension of the other of said interior frame positioning cylinders.

12. The apparatus of claim 8 wherein said second pair of interior frame positioning cylinders each comprises a cylinder body which is fixedly connected to a different one of said side rails of said interior frame, and a piston rod which is reciprocally movable along the nearest one of the side rails of said main frame with parallel movement of said interior frame between the opposite end rails of said main frame.

13. The apparatus of claim 1 wherein said first pair of moving means comprises a first pair of fluid operated cylinders.

14. The apparatus of claim 13 wherein each of said first pair of fluid operated cylinders comprises a first cylinder body which is fixedly attached to an interior facing surface of a different one of said interior frame end rails, and a first piston rod which extends from said first cylinder body opening in a different one of said interior frame end rails, each said first piston rod being slidably attached on an end portion thereof to a nearest one of said main frame end rails for permitting movement of said interior frame transversely of said main frame upon operation of said second pair of moving means.

15. The apparatus of claim 13 wherein each of said first pair of cylinders comprises a hydraulically operated cylinder.

16. The apparatus of claim 1 wherein said second pair of moving means comprises a second pair of fluid operated cylinders.

17. The apparatus of claim 16 wherein each of said second pair of cylinders comprises a hydraulically operated cylinder.

18. The apparatus of claim 16 wherein each of said second pair of fluid operated cylinders comprises a second cylinder body fixedly attached to an interior facing surface of a different one of said interior frame side rails and a second piston rod which extends from said second cylinder body through an opening in a different one of said interior frame side rails, each said second piston rod being slidably attached on an end portion thereof to a nearest one of said main frame side rails for permitting movement of said interior frame longitudinally of said main frame upon operation of said first pair of moving means.

19. The apparatus of claim 1 where in said lifting means comprises four simultaneously and separately operable fluid operated lifting cylinders, two of said lifting cylinders being attached on opposite outside front portions of said main frame side rails and two of said lifting cylinders being attached on opposite outside rear portions of said main frame side rails.

20. The apparatus of claim 19 wherein each of said lifting cylinders comprises a hydraulically operated cylinder.

21. The apparatus of claim 1 wherein said main frame rails form an enclosed, raised, rectangularly shaped border about said ball transfer elements of said main frame floor.

22. The apparatus of claim 1 wherein said interior frame rails form an enclosed, raised rectangularly shaped border on and along edge portions of said flat floor plate of said interior frame.

23. An apparatus for accurately positioning a massive article disposed thereon under a separately supported second article to facilitate attachment of said massive article to said second article, said apparatus comprising a main frame having a rectangularly shaped floor assembly defined by an array of spaced apart, uniformly distributed ball transfer elements, and a raised main frame railing attached on a lower edge portion thereof to said floor assembly to form a front rail, a rear rail and a pair of side rails;

a rectangularly shaped interior frame including a flat floor plate movably disposed on said ball transfer elements and including a raised interior frame railing attached over edge portions of a broad surface of said floor plate to form a front rail, a rear rail and a pair of side rails, said interior frame being movable on said ball transfer elements, longitudinally, up to a first maximum distance between the front and rear rails of said main frame and, transversely, up to a second maximum distance between the side rails of said main frame;

a first pair of coacting, fluid operated interior frame positioning cylinders aligned with each other along a longitudinal centerline and said interior frame, each of said first pair of interior frame positioning cylinders having a cylinder body fixedly connected to a different one of the front and the rear rails of said interior frame and having a piston rod projecting through an opening in a different one of the front and rear rails of said interior frame toward a nearest one of the front and rear rails of said main frame;

a second pair of coacting, fluid operated interior frame positioning cylinders aligned with one another along a transverse centerline of said interior frame, each of said second pair of interior frame positioning cylinders having a cylinder body fixedly connected to a different one of the sides rails of said interior frame and having a piston rod projecting through an opening in a different one of the side rails of said interior frame toward a nearest one of the side rails of said main frame;

a separate main frame rail guide assembly fixedly connected to an outer end portion of the piston rod of each of said interior frame positioning cylinders, each said main frame rail guide assembly being movably mounted on a central portion of a different one of the front, rear and side rails of said main frame for movement along said main frame rails with parallel movement of said interior frame; and means for lifting and lowering said main frame to lift and lower said interior frame and an article supported on said interior frame.

24. The apparatus of claim 23 wherein an upper central portion of each of the front, rear, and side rails of said main frame contains an elongated slot having closed upper and lower sides and closed opposite ends, an outer end portion of a piston rod of a different one of said interior frame positioning cylinders extending through each said slot, each said main frame rail guide assembly comprising a pair of parallel, vertically extending, spaced apart plates positioned on opposite sides of a different said slot, said plates being spaced from a corresponding one of said main frame rails;

a spacer block having an upper plate, a lower plate and a central member adjoining said upper and said lower plate, said spacer block being connected between said parallel, vertically extending plates and containing a cylindrical opening through said central member through which a different one of the piston rods of the interior frame positioning cylinders projects;

roller means connected between upper corner portions of said parallel, vertically extending plates and mounted over a closed upper side of said slot; and a cap member connected to an outer one of said parallel, vertically extending plates, the piston rod of said interior frame positioning cylinders extending through an opening in each of said parallel, vertically extending plates and being threadably connected to said cap member.

25. The apparatus of claim 24 wherein each said main frame rail guide assembly further comprises a first series of roller bearings mounted in slots formed in said upper plate and projecting upwardly out of said upper plate for preventing frictional engagement of said upper plate with said upper closed side of said slot as said assembly moves along a corresponding one of said rails with parallel movement of said interior frame; and a second series of roller bearings mounted in said parallel, vertically extending plates and projecting inwardly from opposing surfaces of said parallel, vertically extending plates toward opposite sides of a corresponding one of the said main frame rails for preventing frictional engagement of said parallel, vertically extending plates against one of said main frame rails as said assembly moves along a corresponding one of said rails with parallel movement of said interior frame.

* * * * *